(12) United States Patent
Shin et al.

(10) Patent No.: US 11,314,663 B2
(45) Date of Patent: Apr. 26, 2022

(54) ELECTRONIC APPARATUS CAPABLE OF BEING CONNECTED TO MULTIPLE EXTERNAL APPARATUSES HAVING DIFFERENT PROTOCOLS THROUGH A CONNECTION PORT AND METHOD OF CONTROLLING THE SAME

(71) Applicant: SAMSUNG ELECTRONICS CO., LTD., Suwon-si (KR)

(72) Inventors: Hyunjong Shin, Suwon-si (KR); Minsang Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/162,437

(22) Filed: Jan. 29, 2021

(65) Prior Publication Data

US 2021/0240639 A1 Aug. 5, 2021

(30) Foreign Application Priority Data

Jan. 30, 2020 (KR) .................. 10-2020-0011372

(51) Int. Cl.
*G06F 13/10* (2006.01)
(52) U.S. Cl.
CPC .................. *G06F 13/102* (2013.01)
(58) Field of Classification Search
None
See application file for complete search history.

(56) References Cited

U.S. PATENT DOCUMENTS

| 2012/0005377 | A1  | 1/2012  | Kim et al. |
| 2012/0137031 | A1  | 5/2012  | Evoy et al. |
| 2012/0265911 | A1  | 10/2012 | Connolly |
| 2017/0286360 | A1  | 10/2017 | Srivastava |
| 2019/0369708 | A1* | 12/2019 | K .................. G06F 1/266 |
| 2020/0012614 | A1  | 1/2020  | Lin et al. |
| 2020/0026683 | A1* | 1/2020  | Olarig ............. G06F 13/4282 |

FOREIGN PATENT DOCUMENTS

| CN | 205792970 U | 12/2016 |
| CN | 206180323 U | 5/2017 |
| CN | 207397265 U | 5/2018 |

OTHER PUBLICATIONS

Communication dated Jun. 28, 2021 issued by the European Intellectual Property Office in counterpart European Application No. 21153555.4.

* cited by examiner

*Primary Examiner* — Scott C Sun
(74) *Attorney, Agent, or Firm* — Sughrue Mion, PLLC

(57) ABSTRACT

An electronic apparatus includes a connection port having a plurality of pins, the connection port being configured to receive a signal through a first pin, the first pin being predefined to correspond to any one of signals of a plurality of protocols receivable through the connection port; and a processor configured to: identify, based on a connection between a connector of an external apparatus and the connection port, whether the signal has a characteristic defined for the first pin, identify, based on the identification that the signal has the characteristic, a protocol corresponding to the characteristic among the plurality of protocols, and control to communicate with the external apparatus based on the identified protocol.

18 Claims, 12 Drawing Sheets

FIG. 4

| Pin | Rev Pin | Description | HDMI Function | Pin | Rev Pin | Description | HDMI Function |
|---|---|---|---|---|---|---|---|
| A1 | B1 | Common Ground | TMDS Data 1 Shield | B12 | A12 | Common Ground | TMDS Data 2 Shield |
| A2 | B2 | Switched with TMDS Clock- | TMDS Data 1+ | B11 | A11 | Switched with TMDS Data 0- | TMDS Data 2+ |
| A3 | B3 | Switched with TMDS Clock+ | TMDS Data 1- | B10 | A10 | Switched with TMDS Data 0+ | TMDS Data 2- |
| A4 | B4 | VBUS (USB Type-C) | | B9 | A9 | VBUS (USB Type-C) | |
| A5 | B5 | Integrated on CC signaling | CEC/SCL/SDA | B8 | A8 | Switched with HPD/HEAC- | Utility/HEAC+ |
| A6 | B6 | D+ (USB Type-C) | | B7 | A7 | D- (USB Type-C) | |
| A7 | B7 | D- (USB Type-C) | HPD/HEAC- | B6 | A6 | D+ (USB Type-C) | |
| A8 | B8 | Switched with Utility/HEAC+ | | B5 | A5 | VBUS (+5V Power) | +5V Power |
| A9 | B9 | VBUS (USB Type-C) | TMDS Data 0+ | B4 | A4 | VBUS (USB Type-C) | |
| A10 | B10 | Switched with TMDS Data 2- | TMDS Data 0- | B3 | A3 | Switched with TMDS Data 1- | TMDS Clock+ |
| A11 | B11 | Switched with TMDS Data 2+ | TMDS Data 0 Shield | B2 | A2 | Switched with TMDS Data 1+ | TMDS Clock- |
| A12 | B12 | Common Ground | | B1 | A1 | Common Ground | TMDS Clock Shield |

ELECTRONIC APPARATUS CAPABLE OF BEING CONNECTED TO MULTIPLE EXTERNAL APPARATUSES HAVING DIFFERENT PROTOCOLS THROUGH A CONNECTION PORT AND METHOD OF CONTROLLING THE SAME

CROSS-REFERENCE TO RELATED APPLICATION

This application is based on and claims priority under 35 U. S. C. § 119 to Korean Patent Application No. 10-2020-0011372, filed on Jan. 30, 2020, in the Korean Intellectual Property Office, the disclosure of which is incorporated by reference herein in its entirety.

BACKGROUND

1. Field

The disclosure relates to an electronic apparatus and a method of controlling the same, and more particularly, to an electronic apparatus capable of being connected to multiple external apparatuses having different protocols through a connection port, and a method of controlling the same.

2. Discussion of Related Art

As the performance and functions of electronic apparatuses are diversified, there are various situations in which the electronic apparatuses require connection with a number of peripheral devices, that is, external apparatuses.

The electronic apparatus are provided with a connection port as an interface for connection with these external apparatuses. The electronic apparatus may identify a signal received from an external apparatus connected through a corresponding port, based on a predefined protocol for a connection port, and perform an operation based on the identified signal.

SUMMARY

According to an aspect of the disclosure, an electronic apparatus may include a connection port having a plurality of pins, the connection port being configured to receive a signal through a first pin, the first pin being predefined to correspond to any one of signals of a plurality of protocols receivable through the connection port; and a processor configured to: identify, based on a connection between a connector of an external apparatus and the connection port, whether the signal has a characteristic defined for the first pin, identify, based on the identification that the signal has the characteristic, a protocol corresponding to the characteristic among the plurality of protocols, and control to communicate with the external apparatus based on the identified protocol.

The plurality of pins may include a ground pin. The processor may be further configured to identify that the connector of the external apparatus is connected to the connection port based on a change in a signal status of the ground pin.

The processor may be further configured to identify the protocol corresponding to the signal based on reception of a signal that has a predefined voltage through the first pin.

The processor may be further configured to identify additional information corresponding to the protocol based on identification of clock or data that has a predefined characteristic in a signal received through a second pin among the plurality of pins.

The processor may be further configured to identify whether the signal received through the second pin has a characteristic corresponding to one of a plurality of versions of the protocol.

The plurality of protocols may include at least one of a high definition multimedia interface (HDMI) and a universal serial bus (USB).

The processor may be further configured to preferentially identify whether the signal has a characteristic defined corresponding to the HDMI among the plurality of protocols.

The processor may be further configured to transmit a signal having a predefined voltage to the external apparatus through a third pin among the plurality of pins based on the connection of the connector of the external apparatus to the connection port.

The electronic apparatus may further include a plurality of communication circuitries corresponding to the plurality of protocols; and a switching module configured to switch a signal connection between the connection port and the plurality of communication circuitries. The processor may be configured to control the switching module to connect between the connection port and a communication circuitry corresponding to the identified protocol.

The connection port may be USB type C.

According to another aspect of the disclosure, a method of controlling an electronic apparatus may include identifying, based on a connection between a connector of an external apparatus and a connection port having a plurality of pins, whether a signal received through a first pin has a characteristic defined for the first pin; identifying, based on the identification that the signal has the characteristic, a protocol corresponding to the characteristic among the plurality of protocols receivable through the connection port; and communicating with the external apparatus based on the identified protocol. The first pin may be predefined to correspond to any one of signals of the plurality of protocols receivable through the connection port.

The plurality of pins may include a ground pin. The method of controlling the electronic apparatus may further include identifying that the connector of the external apparatus is connected to the connection port based on a change in a signal status of the ground pin.

The identifying whether the signal has the characteristic defined for the first pin may include identifying the protocol corresponding to the signal based on reception of a signal having a predefined voltage through the first pin.

The identifying of the protocol corresponding to the characteristic may include identifying additional information corresponding to the protocol based on identification of clock or data that has a predefined characteristic in a signal received through a second pin among the plurality of pins.

The method may further include identifying whether a signal has a characteristic corresponding to any one of a plurality of versions of the protocol.

The plurality of protocols may include at least one of a high definition multimedia interface (HDMI) and a universal serial bus (USB).

In the identifying of whether the signal has the characteristic defined for the first pin, whether the signal has a characteristic defined corresponding to the HDMI among the plurality of protocols is preferentially identified.

The identifying of whether the signal has the characteristic defined for the first pin may include transmitting a signal having a predefined voltage through a third pin among the plurality of pins based on the connection of the connector of the external apparatus to the connection port.

The electronic apparatus may include a plurality of communication circuitries corresponding to the plurality of protocols; and a switching module configured to switch a signal connection between the connection port and the plurality of communication circuitries, and the method of controlling the electronic apparatus may further include controlling the switching module to connect between the connection port and a communication circuitry corresponding to the identified protocol.

According to another aspect of the disclosure, a nonvolatile computer-readable recording medium recorded may include a program of a method executable by a processor of an electronic apparatus. The method may include identifying, based on a connection between a connector of an external apparatus and a connection port having a plurality of pins, whether a signal received through a first pin has a characteristic defined for the first pin; identifying, based on the identification that the signal has the characteristic, a protocol corresponding to the characteristic among a plurality of protocols receivable through the connection port; and communicating with the external apparatus based on the identified protocol, wherein the first pin is predefined to correspond to any one of signals of the plurality of protocols receivable through the connection port.

BRIEF DESCRIPTION OF THE DRAWINGS

The above and other aspects, features, and advantages of certain embodiments of the disclosure will be more apparent from the following description, taken in conjunction with the accompanying drawings, in which:

FIG. 4 is a diagram of a pin map of a protocol applicable to a wired interface circuitry of the electronic apparatus according to an embodiment.

DETAILED DESCRIPTION

Figure 1:
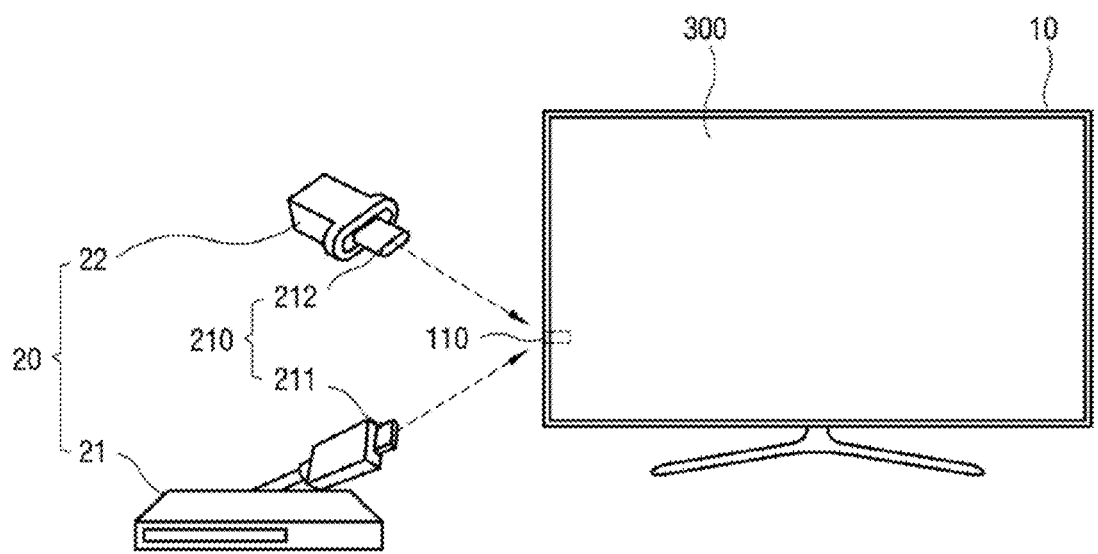
FIG. 1 is a diagram of an electronic apparatus and a plurality of external apparatuses according to an embodiment.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, terms including ordinal numbers such as first and second are used only for the purpose of distinguishing one component from other components, and singular expressions include plural expressions unless the context clearly indicates otherwise. Also, in embodiments of the disclosure, it should be understood that terms such as 'comprise', 'configured', 'include', and 'have' do not preclude the existence or addition possibility of one or more other features or numbers, steps, operations, components, parts, or combinations thereof. In addition, in the embodiment of the disclosure, a 'module' or a 'unit' performs at least one function or operation, and may be implemented in hardware or software, or a combination of hardware and software, and may be integrated into at least one module. In addition, in embodiments of the disclosure, at least one of the plurality of elements refers to not only all of the plurality of elements, but also each one or all combinations thereof excluding the rest of the plurality of elements.

The terms used in the disclosure and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

The terms such as "first," "second," and so on may be used to describe a variety of elements, but the elements should not be limited by these terms. The terms are used only for the purpose of distinguishing one element from another. For example, without exceeding the scope of protection, a first element may be designated as a second element and likewise, a second element may also be designated as a first element.

Provided is an electronic apparatus that allows signals of a plurality of different protocols to be transmitted or received to or by a connection port provided for connection of an external apparatus, and a method of controlling the same.

FIG. 1 shows an example of an electronic apparatus according to an embodiment.

As shown in FIG. 1, an electronic apparatus 10 according to an embodiment may include a connection port 110 capable of being connected to at least one external apparatus 20.

The external apparatus 20 may include a connector 210.

In one embodiment, one of a plurality of external apparatuses 20, for example, a first external apparatus 21 or a second external apparatus 22, may be connected to the connection port 110.

Specifically, referring to FIG. 1, by connecting either a connector 211 of the first external apparatus 21 or a connector 212 of the second external apparatus 22 to the connection port 110, the first external apparatus 21 or the second external apparatus 22 may be connected to the electronic apparatus 10.

In the electronic apparatus 10 according to the embodiment, the connection port 110 may be included in a wired interface circuitry (100 in FIG. 5) provided to transmit or receive a signal according to a predetermined protocol, that is, a predetermined specification or standard. That is, the wired interface circuitry 100 may include a connector, a terminal, or a port as a connection means corresponding to a corresponding protocol, and the connection port 110 is an example of the connection means.

The connector 210 of the external apparatus 20 may correspond to the connection port 110 provided in the electronic apparatus 10 to be connected.

In one embodiment, the electronic apparatus 10 may communicate with the external apparatus 20 based on the connection between the connector 210 of the external apparatus 20 and the connection port 110.

Figure 2:
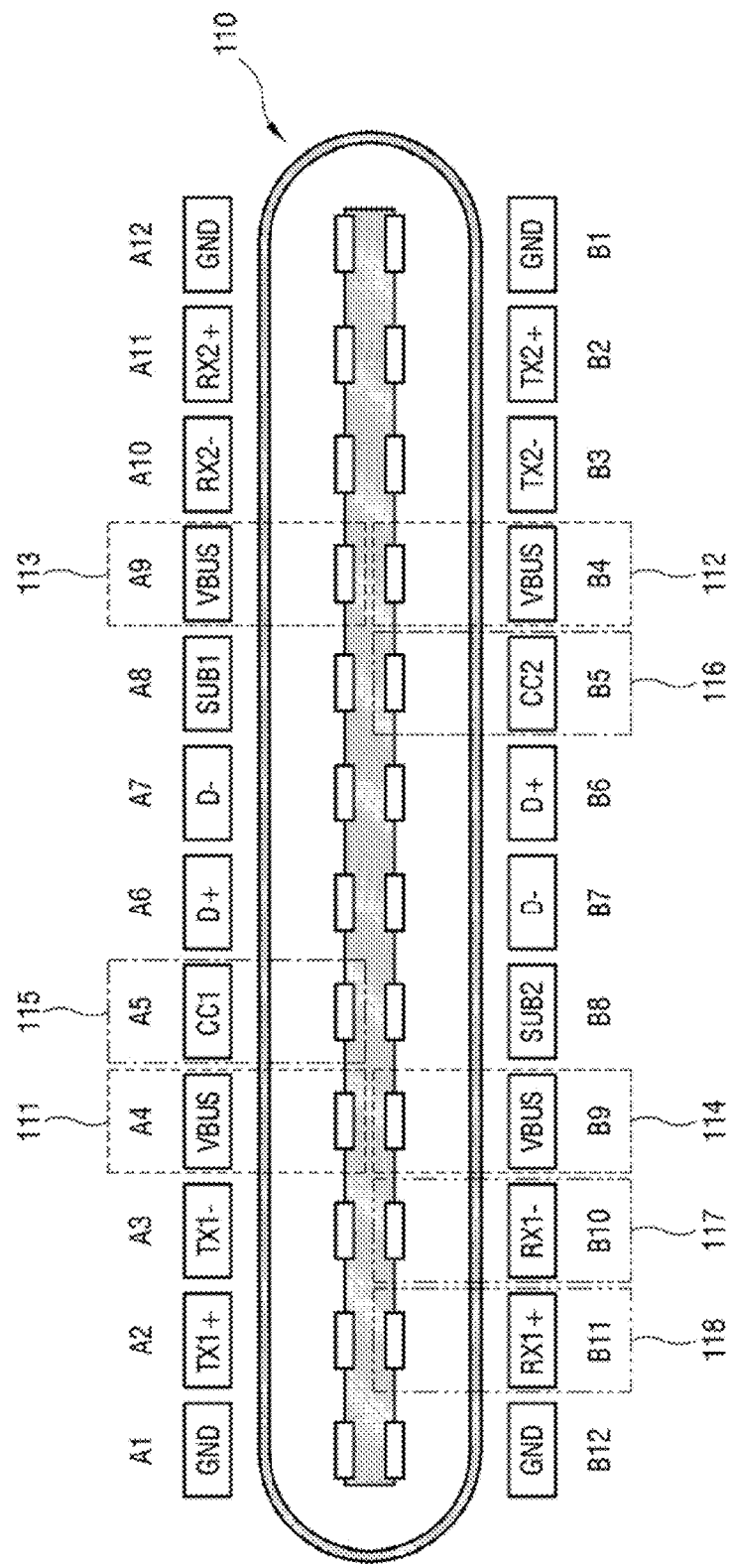
FIG. 2 is a diagram of a connection port of the electronic apparatus according to an embodiment.
Figure 3:
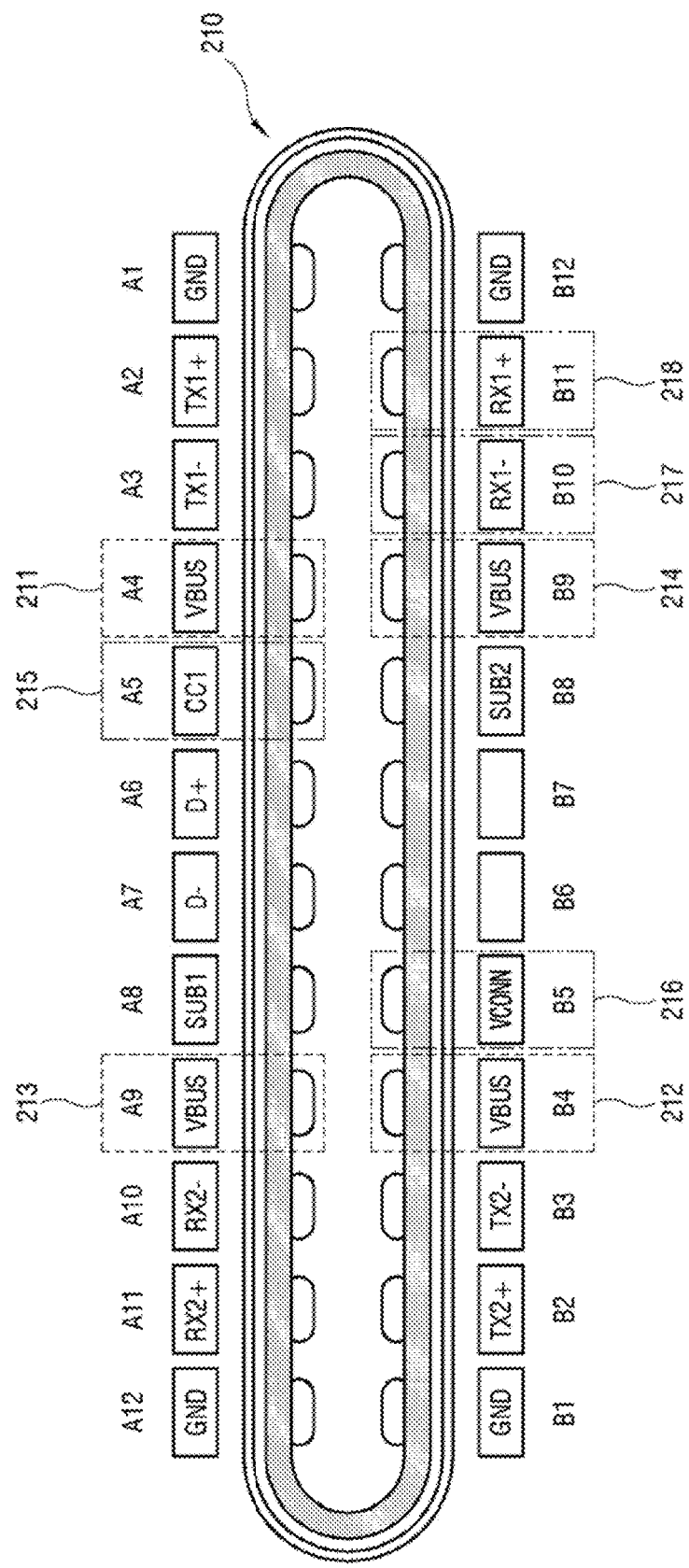
FIG. 3 is a diagram of a connector of an external apparatus corresponding to the connection port of the electronic apparatus according to an embodiment.

FIG. 2 shows an example of the connection port of the electronic apparatus according to the embodiment, and FIG. 3 shows an example of the connector of the external apparatus that corresponds to the connection port of the electronic apparatus.

In the electronic apparatus 10 according to the embodiment, the connection port 110 of the wired interface circuitry 100 may be implemented as a common port allowing transmission or reception of signals of a plurality of different protocols.

The connection port 110 may correspond to a predetermined protocol in appearance. For example, as shown in FIG. 2, the connection port 110 has a shape corresponding to a universal serial bus (USB) protocol, and may be implemented to have a shape of a USB C or USB Type-C port.

In one embodiment, the wired interface circuitry 100 including the connection port 110 having a shape corresponding to a predetermined protocol may implement an alternate mode.

The alternate mode allows an interface to transmit or receive signals of a plurality of different protocols. For example, the interface implementing an alternate mode for USB Type C may be implemented to receive signals based on other protocols as well as signals based on the USB protocol.

According to an embodiment, the wired interface circuitry 100 implementing the alternate mode for USB Type C may receive and process a signal based on a protocol other than the signal based on the USB protocol, for example, a high definition multimedia interface (HDMI) protocol. As another example, the wired interface circuitry 100 implementing the alternate mode for USB Type C may receive and process a signal based on a DisplayPort (DP) protocol.

However, the implementation type of the wired interface circuitry 100 and the connection port 110 is not limited to the USB Type C or the alternate mode for USB Type C. In other words, any form of a common port that allows transmission or reception of signals of a plurality of different protocols may be implemented as the connection port 110 of the electronic apparatus 10.

In the following disclosure, a case in which the connection port 110 is implemented as the common port capable of receiving the signals of the plurality of protocols and may receive a USB signal and an HDMI signal will be described as an example.

In the disclosure, the type of the external apparatus 20 is not limited, and as an embodiment, the external apparatus 20 may include the connector 210 capable of being connected to the connection port 110 which may be capable of receiving the USB signal and the HDMI signal as the signals of the plurality of protocols.

The at least one external apparatus 20 may include a first external apparatus 21. As shown in FIG. 1, the first external apparatus 21 may be implemented as an HDMI source device capable of providing signals/data based on the HDMI protocol. The HDMI source device may include, for example, a set-top box (STB), an optical disk player such as a Blu-ray or a digital versatile disc (DVD), or the like.

The at least one external apparatus 20 may include a second external apparatus 22. As shown in FIG. 1, the second external apparatus 22 may be implemented as a mobile storage device such as a USB flash drive (hereinafter, referred to as a USB memory or a USB stick) capable of transmitting and receiving signals/data based on a USB protocol.

However, since the implementation type of the external apparatus 20 is not limited in the disclosure, other forms, for example, a mobile device capable of transmitting and receiving the signals/data based on the USB protocol, a DP source device capable of providing the signals/data based on the DP protocol, or the like may be included in the at least one external apparatus 20 of the disclosure.

According to an embodiment, the at least one external apparatus 20 may be connected to the electronic apparatus 10 via a cable. For example, as shown in FIG. 1, regarding the first external apparatus 21 implemented as the HDMI source device, the connector 211 provided at one end of the cable is connected to the connection port 110, so the electronic apparatus 10 and the first external apparatus 21 may be interconnected.

According to an embodiment, the external apparatus 20 may be defined as a source device and the electronic apparatus 10 may be defined as a slave device, in a state in which the electronic apparatus 10 and the external apparatus 20 are communicatively interconnected. However, this is only a convenient term for distinguishing the two devices, and the names or roles of the devices do not limit the functions of each device.

As shown in FIG. 2, the connection port 110 may be provided with a plurality of pins.

As shown in FIG. 3, the connector 210 of the external apparatus 20 may be provided with a plurality of pins corresponding to the plurality of pins of the connection port 110, respectively.

The plurality of pins provided on the connection port 110 and the connector 210 may each be defined to transmit or receive a signal having characteristics defined corresponding to any one of a plurality of protocols, for example, USB or HDMI.

According to an embodiment, the electronic apparatus 10 may receive a signal having characteristics defined corresponding to the pin through a predefined pin among the plurality of pins provided in the connection port 110 of the wired interface circuitry 100. For example, the electronic apparatus 10 may receive a power signal of a predetermined level, for example, 5 V as the predefined characteristics through at least one pin defined as a power pin among the plurality of pins of the connection port 110.

FIG. 4 shows a pin map of a protocol applicable to a wired interface circuitry of an electronic apparatus according to an embodiment. FIG. 4 shows a pin map corresponding to a HDMI alternate mode for USB Type C, that is, an HDMI source pin assignment for USB Type-C connector as an example.

As shown in FIGS. 2, 3 and 4, in the HDMI alternate mode for USB Type C, the plurality of pins of the connector 210 may include at least one pin defined as ground pins (referred to as common GND) such as pins A12 and B12.

Here, the ground pin may be defined to receive a signal having a low state as a predefined status based on the connection of the connector 210 of the external apparatus 20 to the connection port 110. That is, in response to the connection of the connector 210 of the external apparatus 20 to the connection port 110, a signal received through the ground pin may be changed from a high state to a low state.

The electronic apparatus 10 according to an embodiment may identify that the connector 210 of the external apparatus 20 is connected to the connection port 110 based on the change in the signal status of the ground pin as described above. As an example, the electronic apparatus 10 may identify based on the change in the signal received through the pin A12 or the pin B12 from the high state to the low state that the connector 210 of the external apparatus 20 is connected to the connection port 110.

Referring to FIGS. 2, 3 and 4, in the HDMI alternate mode for USB Type C, pins A4 111, 211, and 411, pins B4 112, 212, and 412, pins A9 113, 213, and 413, and pins B9 114, 214, and 414 are defined as a USB power pin (VBUS pin) for USB usage (USB 5 V power from sink).

When the electronic apparatus 10 is connected to the external apparatus 20, the electronic apparatus 10 may transmit a power signal having predefined characteristics, for example, a power signal of 5 V, to the external apparatus 200 through the pin A4 111, the pin B4 112, the pin A9 113, or the pin B9 114 of the connection port 110.

When the external apparatus 20 is connected to the electronic apparatus 10, the external apparatus 20 may receive a power signal having predefined characteristics, for example, a power signal of 5 V, from the electronic apparatus 10 through the pin A4 211, the pin B4 212, the pin A9 213, or the pin B9 214 of the connector 210.

In addition, in the HDMI alternate mode for USB type C, pins A5 115, 215, and 415 and pins B5 116, 216, and 416 may be defined as HDMI power pins for the alternate mode (HDMI 5 V power form source).

When the electronic apparatus 10 is connected to the external apparatus 20, the electronic apparatus 10 may receive a power signal having predefined characteristics, for example, a power signal of 5 V, from the external apparatus 200 through the pin A5 115 or the pin B5 116 of the connection port 110.

When the external apparatus 20 is connected to the electronic apparatus 10, the external apparatus 20 may transmit a signal having a voltage of predefined characteristics, for example, a power signal of 5 V, to the electronic apparatus 10 through the pin A5 215 or the pin B5 216 of the connector 210.

In addition, in the HDMI alternate mode for USB Type C, pins B10 117, 217, and 417 and pins B11 118, 218, and 418 are defined as transition minimized differential signaling (TMDS) type data pins for the alternate mode (TMDS data).

When the electronic apparatus 10 is connected to the external apparatus 20, the electronic apparatus 10 may identify whether a clock signal (hereinafter, referred to as TDMS clock signal) having predefined characteristics is received from the external apparatus 200 through the pin B10 117 or the pin B11 118 of the connection port 110.

When the external apparatus 20 is connected to the electronic apparatus 10, the external apparatus 20 may transmit a clock signal having predefined characteristics, that is, a TMDS clock signal, to the electronic apparatus 10 through the pin B10 217 or the pin B11 218 of the connector 210.

When the electronic apparatus 10 according to an embodiment is connected to the external apparatus 20, the electronic apparatus 10 may identify whether the signal received through at least one of the plurality of pins of the connection port 110 of the wired interface circuitry 100 has characteristics defined corresponding to the pin as described above and identify the protocol defined corresponding to the characteristics among the plurality of protocols in response to the identified results, thereby performing the communication with the external apparatus 20 based on the identified protocol.

Specific operations of the electronic apparatus 10 related to the identification of such a protocol will be described in more detail in the following embodiments.

The electronic apparatus 10 according to an embodiment may receive a signal provided from an external signal supply source such as, an image source. For example, the source may include data related to predetermined content. and The electronic apparatus 10 may then process the received content data according to a preset process and display the processed content data as an image.

In one embodiment, as shown in FIG. 1, the electronic apparatus 10 may be implemented as a display apparatus equipped with a display 300 that may display an image. However, since the implementation type of the electronic apparatus 10 is not limited, as another embodiment, the electronic apparatus 10 may be implemented as an image processing apparatus such as a set-top box that transmits a signal to a separate connectable display.

According to an embodiment, the electronic apparatus 10 implemented as the display apparatus may be implemented as a television (TV) capable of processing broadcast video based on at least one of a broadcast signal, broadcast information, or broadcast data that is received from sending equipment of a broadcasting station. FIG. 1 shows, as an example, the case in which the electronic apparatus 10 is a television. In this case, the electronic apparatus 10 may be provided with a tuner for tuning a broadcast signal for each channel.

When the electronic apparatus 10 is a television, the electronic apparatus 10 may receive broadcast content based on at least one of the broadcast signal, the broadcast information, or the broadcast data received from the sending equipment of the broadcasting station through additional devices, such as, a set-top box (STB), a one-connect box (OC box), and a media box, that may be directly connected to the electronic apparatus 10 or connected to the electronic apparatus 10 by a cable or the like. This additional device may be included in the external apparatus 20 as an implementation example of the second external apparatus 21 such as the HDMI source device. However, a connection method between the electronic apparatus 10 and the additional device is not limited to the cable, and various wired/wireless interfaces may be applied.

The electronic apparatus 10 may wirelessly receive, for example, a radio frequency (RF) signal transmitted from a broadcasting station, that is, broadcast content. To this end, an antenna capable of receiving a signal is provided in the electronic apparatus 10.

In the electronic apparatus 10, the broadcast content may be received through terrestrial waves, cables, satellites, and the like, and the signal source is not limited to the broadcasting station. That is, any apparatus or station capable of transmitting and receiving data may be included in the image source according to the disclosure.

Standards of the signal received from the electronic apparatus 10 may be configured in various ways corresponding to the implementation type of the device, and the electronic apparatus 10 corresponds to an implementation type of the wired interface circuitry 100, and may receive, as video content, signals or data corresponding to standards such as a high definition multimedia interface (HDMI), HDMI-consumer electronics control (HDMI-CEC), a display port (DP), composite video, component video, super video, a digital visual interface (DVI), thunderbolt, a RGB cable, Syndicat des Constructeurs d'Appareils Radiorécepteurs et Téléviseurs (SCART), and a universal serial bus (USB), by wire.

According to an embodiment, the electronic apparatus 10 may be implemented as a smart TV or an internet protocol TV (IP TV). The smart TV may receive and display the broadcast signal in real time, and may have a web browsing function. Accordingly, the smart TV may be a TV that provides a convenient user environment for searching and consuming various content through the Internet while displaying the broadcast signal in real time. In addition, the smart TV may include an open software platform to provide interactive services to users. Therefore, the smart TV can provide various content, for example, content of applications providing predetermined services, to users through the open software platform. These applications are application programs that may provide various types of services, and include, for example, applications that provide services such as SNS, finance, news, weather, maps, music, movies, games, and e-books.

However, since the idea of the disclosure is not limited to the implementation example of the electronic apparatus 10, the electronic apparatus 10 may also be applied to various types of implementation examples capable of processing an image, for example, a monitor of a personal computer (PC) such as a desktop or a laptop, in addition to a TV. As another example, the electronic apparatus 10 of the disclosure may be implemented as a terminal device such as a smart phone or a smart pad such as a tablet, or a mobile device.

The electronic apparatus 10 may process a signal so that a moving image, a still image, an application, an on-screen display (OSD), a user interface for various operation controls, and the like based on signals/data stored in internal/external storage media are displayed on the screen.

The electronic apparatus 10 may receive content by wired or wireless network communication from various external apparatuses including a content provider that is provided to provide content, and a type of communication is not limited thereto.

Specifically, the electronic apparatus 10 may correspond to the implementation type of the wireless interface (510 in FIG. 5) to be described later, and may receive, as video content, signals corresponding to standards, such as Wi-Fi, Wi-Fi direct, Bluetooth, Bluetooth low energy, Zigbee, ultra-wideband (UWB), an near field communication (NFC), through wireless network communication. In addition, the electronic apparatus 10 may receive a content signal through a wired network communication such as the Ethernet.

Hereinafter, the configurations of the electronic apparatus according to an embodiment will be described with reference to the drawings.

Figure 5:
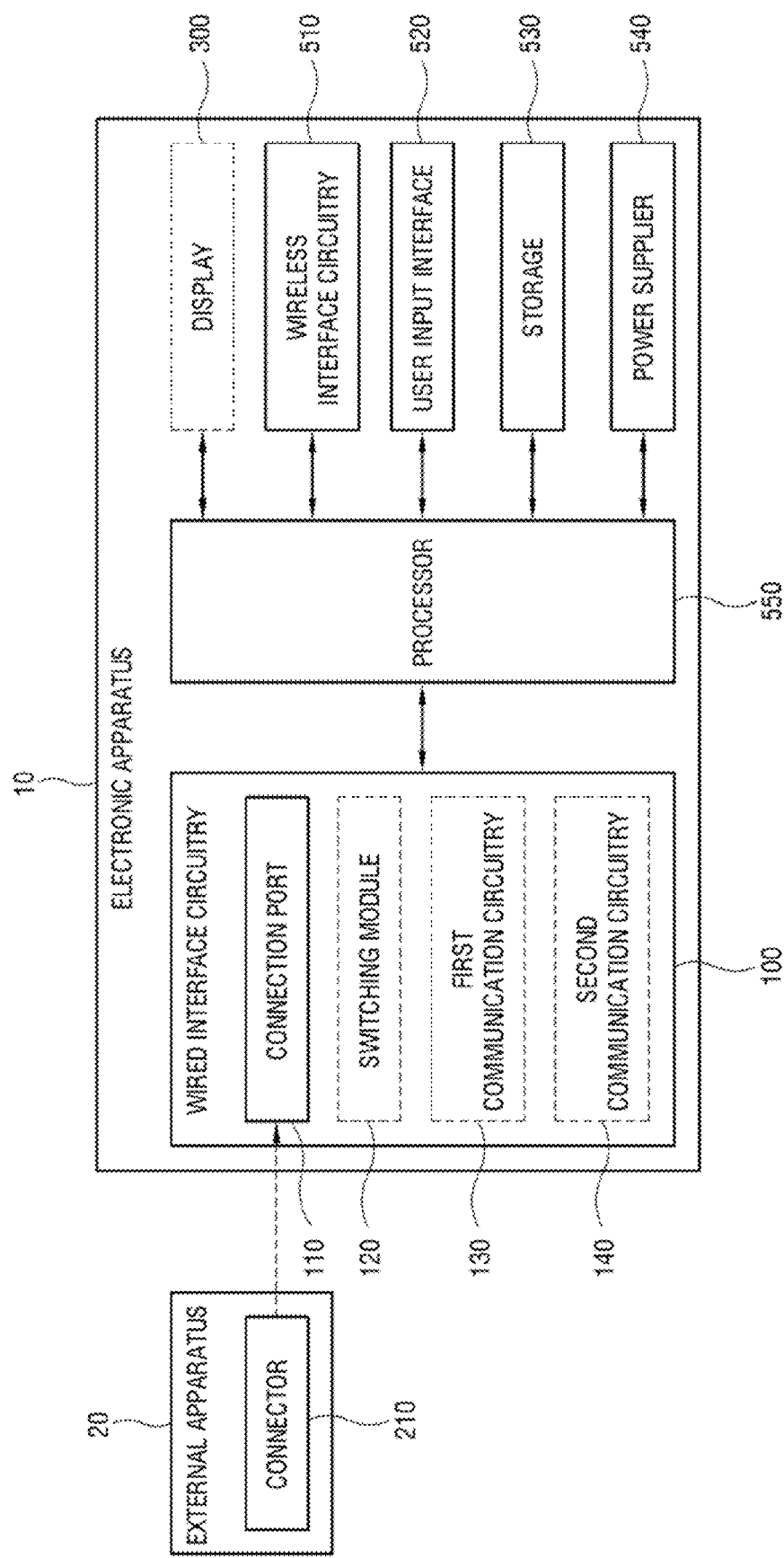
FIG. 5 is a block diagram of the electronic apparatus according to an embodiment.

FIG. 5 is a block diagram showing a configuration of the electronic apparatus according to an embodiment.

As shown in FIG. 5, the electronic apparatus 10 according to an embodiment may include the display 300, the wired interface circuitry 100, the wireless interface circuitry 510, a user input interface 520, a storage 530 including a driver, a power supplier 540, and a processor 550.

However, the configuration of the electronic apparatus 10 according to the embodiment shown in FIG. 5 is only an example, and the electronic apparatus according to another embodiment may be implemented in a configuration other than the configuration shown in FIG. 5. That is, the electronic apparatus 10 of the disclosure may be implemented in a form in which configurations other than the configurations shown in FIG. 5 are added, or at least one of the configurations shown in FIG. 5 is excluded. In addition, the electronic apparatus 10 of the disclosure may be implemented in a form in which a part of the configurations configured in FIG. 5 is changed.

The display 300 may display an image.

The implementation scheme of the display 300 may be implemented in various display schemes such as liquid crystal, plasma, a light-emitting diode, an organic light-emitting diode, a surface-conduction electron-emitter, carbon nano-tube, and nano-crystal without any limitations. In one embodiment, the display 300 may include a display panel displaying an image, and may further include additional configurations, such as a driver, according to the implementation scheme.

According to an embodiment, an image of content received from the external apparatus 20 may be displayed on the display 300.

The wired interface circuitry 100 and the wireless interface circuitry 510 may allow the electronic apparatus 10 to communicate with various external apparatuses.

The wired interface circuitry 100 may transmit/receive signals/data according to the standards such as HDMI, HDMI-CEC, USB, component, display port (DP), DVI, thunderbolt, and RGB cable. Here, the wired interface circuitry 100 may include the connection port 110 such as at least one connector, terminal, or port corresponding to each of these standards.

The wired interface circuitry 100 may be implemented to include an input port that receives a signal from an image source or the like, and may be provided to transmit and receive signals in both directions by further including an output port in some cases.

The wired interface circuitry 100 may include connectors, ports, or the like according to video and/or audio transmission standards such as an HDMI port, DisplayPort, a DVI port, thunderbolt, composite video, component video, super video, and SCART so that an antenna capable of receiving a broadcast signal according to broadcasting standards such as terrestrial/satellite broadcasting may be connected or a cable capable of receiving a broadcast signal according to cable broadcasting standards may be connected. As another example, the electronic apparatus 10 may also include the antenna capable of receiving the broadcast signal.

The electronic apparatus 10 may further include a tuner for tuning the received broadcast signal for each channel when the video/audio signal received through the interface circuitry 100 is a broadcast signal. The tuner may include a demodulator that demodulates a tuned broadcast signal of a specific channel and outputs the demodulated broadcast signal as a transport stream (TS) type signal. In other words, the tuner and the demodulator may be designed as a single chip in an integrated form, or may each be implemented as two separate chips.

The wired interface circuitry 100 may include a connector, a port, or the like according to a universal data transmission standard such as a USB port.

In the electronic apparatus 10 according to an embodiment, the wired interface circuitry 100 may include the input port 110 for the USB type C, and in this case, the wired interface circuitry 100 may implement the HDMI alternate mode.

The wired interface circuitry 100 may include a connector, a port, or the like to which an optical cable may be connected according to an optical transmission standard. The wired interface circuitry 100 may be connected to an external microphone or an external audio device having a microphone, and may include a connector or a port capable of receiving or inputting an audio signal from an audio device. The wired interface circuitry 100 may be connected to an audio device such as a headset, an earphone, and an external speaker, and may include a connector, a port, or the like capable of transmitting or outputting an audio signal to the audio device. The wired interface circuitry 100 may include a connector or a port according to a network transmission standard such as the Ethernet. For example, the wired interface circuitry 100 may be implemented as a LAN card or the like which is wired to a router or a gateway.

The wired interface circuitry 100 may be wired to a set-top box, an external device such as an optical media playback device, an external display apparatus, a speaker, a server, or the like through the connector or the port in a 1:1 or 1:N (N is a natural number) manner to receive video/audio signals from the corresponding external device or transmit the video/audio signals to the corresponding external device. The wired interface circuitry 100 may include a connector or a port for separately transmitting video/audio signals.

According to an embodiment, the wired interface circuitry 100 may be built in the electronic apparatus 10, but may be implemented in the form of a dongle or a module and may be detached from the connector of the electronic apparatus 10.

The wireless interface circuitry 100 may include a plurality of communication circuitries including wireless communication modules (S/W module, chip, and the like) corresponding to various kinds of communication protocols.

According to an embodiment, the wired interface circuitry 100 may include a switching module 120, as shown in FIG. 5. The wired interface circuitry 100 may include a first communication circuitry 130 and a second communication circuitry 140 as a plurality of communication circuitries each corresponding to a plurality of protocols.

The switching module 120 may switch a signal connection between the connection port 110 and the plurality of communication circuitries, for example, the first communication circuitry 130 and the second communication circuitry 140.

The electronic apparatus 10 shown in FIG. 5, may provide a case where the wired interface circuitry 100 includes the first communication circuitry 130 and the second communication circuitry 140 as the plurality of communication circuitries is illustrated as an example. However, since the number of communication circuitries are not limited in the disclosure, the electronic apparatus 10 may be implemented with the wired interface circuitry 100 further including at least one communication circuitry corresponding to other protocols other than the first communication circuitry 130 and the second communication circuitry 140.

The wireless interface circuitry 510 may be implemented in various ways corresponding to the implementation type of the electronic apparatus 10. For example, the wireless interface circuitry 510 may use wireless communications such as radio frequency (RF), Zigbee, Bluetooth, Wi-Fi, ultra wideband (UWB), and near field communication (NFC) as a communication method.

The wireless interface circuitry 510 may include a plurality of communication circuitries including wireless communication modules (S/W module, chip, and the like) corresponding to various kinds of communication protocols.

According to an embodiment, the wireless interface circuitry 510 may include a wireless LAN unit. The wireless LAN unit may be wirelessly connected to an external apparatus through an access point (AP) under the control of the processor 550. The wireless LAN unit may include a WiFi module.

According to an embodiment, the wireless interface circuitry 510 may include a wireless communication module that wirelessly supports one-to-one direct communication between the electronic apparatus 10 and an external apparatus without the access point. The wireless communication module may be implemented to support communication methods such as Wi-Fi direct, Bluetooth, and Bluetooth low energy. When the electronic apparatus 10 directly communicates with an external apparatus, the storage 530 may store identification information (for example, a MAC address or an IP address) on an external apparatus that is a communication target device.

The electronic apparatus 10 according to an embodiment, may include the wireless interface circuitry 510 provided to perform wireless communication with the external apparatus by at least one of a wireless LAN unit and a wireless communication module according to performance.

According to another embodiment, the wireless interface circuitry 510 may further include a communication module using various communication methods such as mobile communication such as LTE, EM communication including a magnetic field, and visible light communication.

The wireless interface circuitry 510 may wirelessly communicate with, for example, a server on a network to transmit and receive a data packet to and from the server.

The wireless interface circuitry 510 may include an IR transmitter and/or an IR receiver capable of transmitting and/or receiving an infrared (IR) signal according to an infrared communication standard. The wireless interface circuitry 510 may receive or input a remote control signal from the remote control or other external devices through the IR transmitter and/or the IR receiver, or transmit or output the remote control signal to other external devices. As another example, the electronic apparatus 10 may transmit and receive the remote control signal with the remote control or other external devices through the wireless interface circuitry 510 of other methods such as Wi-Fi or Bluetooth.

According to an embodiment, the wireless interface circuitry 510 may transmit predetermined data as information on a user voice received through a sound receiver such as a microphone to the external apparatus such as a server. Here, the type/kind of transmitted data is not limited, and may include, for example, an audio signal corresponding to a voice uttered by a user, a voice feature extracted from an audio signal, and the like.

In addition, the wireless interface circuitry 510 may receive data of a processing result of the corresponding user voice from the external apparatus such as the server. The electronic apparatus 10 may output a sound corresponding to a result of processing a voice based on the received data through an internal or external loudspeaker.

However, in the above-described embodiment, as an example, the user voice may not be transmitted to the server, but may be processed by itself in the electronic apparatus 10. That is, in another embodiment, the electronic apparatus 10 may be implemented to perform the role of an STT server.

The electronic apparatus 10 may communicate with an input apparatus such as a remote control through the wireless interface circuitry 510 to receive a sound signal corresponding to the user voice from the input apparatus.

According to an embodiment of electronic apparatus 10, a communication module for communicating with the external server or the like and a communication module for communicating with a remote control may be different from each other. For example, the electronic apparatus 10 may communicate with the server through an Ethernet modem or a Wi-Fi module, and communicate with a remote control and a Bluetooth module.

According to an embodiment of the electronic apparatus 10, a communication module communicating with the external server or the like and a communication module communicating with a remote control may be the same as each other. For example, the electronic apparatus 10 may communicate with the server and the remote control through a Bluetooth module.

The user input interface 520 may transmit various preset control commands or unlimited information to the processor 550 based on user input.

The user input interface 520 may include a keypad (or input panel) including buttons such as a power key, a number key, and a menu key provided on the main body of the electronic apparatus 10.

According to an embodiment, the user input interface 520 may include an input apparatus that generates a preset command/data/information/signal to be able to remotely control the electronic apparatus 10 and transmits the generated preset command/data/information/signal to the electronic apparatus 10. The input apparatus may include a remote control, a keyboard, a mouse, and the like, and may be separated from the main body of the electronic apparatus 10 to receive the user input. The remote control may be provided with a touch sensing unit that receives a user's touch input and/or a motion sensing unit that senses a user's motion. The input apparatus may include a terminal device such as a smartphone in which a remote control application is installed. In this case, the user's touch input may be received through the touch screen.

The input apparatus may become an external apparatus capable of the wireless communication with the main body of the electronic apparatus 10, and the wireless communication may include the Bluetooth, the infrared communication, the RF communication, the wireless LAN, the Wi-Fi Direct, and the like.

According to an embodiment, the user input interface 520 may further include a voice input unit that receives voice/sound uttered from the user. The voice input unit may be implemented as a microphone capable of receiving user voice.

The storage 530 may be configured to store various data of the electronic apparatus 10.

The storage 530 may store data even when power supplied to the electronic apparatus 10 is cut off, and may be provided as a writable nonvolatile memory (writable ROM) to reflect fluctuations. That is, the storage 530 may be provided as any one of a flash memory, EPROM, or EEPROM. The storage 530 may further include a volatile memory such as DRAM or SRAM in which the read or write speed of the electronic apparatus 10 is faster than that of the nonvolatile memory.

Data stored in the storage 530 may include, for example, various programs, applications that can be executed on the operating system, image data, additional data, and the like, in addition to an operating system for driving the electronic apparatus 10.

Specifically, the storage 530 may store input/output signals or data corresponding to the operation of each component under the control of the processor 550. The storage 530 may store a control program for controlling the electronic apparatus 10, a UI related to an application provided by a manufacturer or downloaded from the outside, images for providing the UI, user information, documents, databases, or related data.

According to an embodiment, the image displayed on the electronic apparatus 10 may be due to data stored in the nonvolatile storage 530 such as a flash memory or a hard disk. The storage 530 may be provided inside or outside the electronic apparatus 10, and when the storage 530 is provided outside the electronic apparatus 10, the storage 530 may be connected to the electronic apparatus 10 through the wired interface circuitry 100. That is, the connection of the connector 210 of the external apparatus 20 such as the USB stick to the connection port 110 of the wired interface circuitry 100 may be an example in which the storage unit 530 is provided outside the electronic apparatus 10.

According to an embodiment, the term storage may include including a memory card (for example, a micro SD card and a memory stick) that is mountable in a storage 530, a ROM and a RAM in the processor 550, or the electronic apparatus 10.

The power supplier 540 may supply power to each component of the electronic apparatus 10.

According to an embodiment, the power supplier 540 may be implemented as a power board that includes a switching mode power supply (SMPS) or a power board including a circuit configuration.

According to an embodiment, power provided from the power supplier 540 may be supplied as USB power to the external apparatus 20 such as the USB stick through the connection port 110 of the wired interface circuitry 100. For example, a power signal may be output to the connector 210 of the external apparatus 20 through a pin defined as a USB power pin (VBUS pin) among the plurality of pins provided in the connection port 110, that is, pin A4 111, pin B4 112, pin B9 114, or pin A9 113.

The power supplier 540 may be provided with a power switching module that switches the connection of the power signal to the connection port 110 as described above.

The processor 550 may control operation of the electronic apparatus 10. The processor 550 may include control programs (or instructions) for performing the control operation, a nonvolatile memory in which control programs are installed, a volatile memory in which at least a part of the installed control programs is loaded, and at least one general-purpose processor, such as a microprocessor, an application processor, or a central processing unit (CPU), for executing the loaded control programs.

The processor 550 may include a single core, a dual core, a triple core, a quad core, or a multiple-number core thereof. The processor 550 may include a plurality of processors, for example, a main processor and a sub processor operating in a sleep mode (for example, only standby power is supplied and does not operate as a display apparatus). In addition, the processor, the ROM, and the RAM can be interconnected via an internal bus.

According to an embodiment, the processor 550 may include an image processor that performs various preset processes on the content signal that is received from the outside or stored. The processor 550 outputs the generated or combined output signals to the display 300 by performing the image processing, and as a result, displays an image corresponding to an image signal on the display 300.

The image processor 10 may include a decoder that decodes an image signal to correspond to an image format of the electronic apparatus 10, and a scaler that adjusts the image signal to match an output standard of the display 300.

According to an embodiment, the decoder may be, for example, an H.264 decoder, but is not limited thereto. That is, the video decoder according to an embodiment may be implemented as a decoder according to various compression standards such as a moving picture experts group (MPEG) decoder or a high efficiency video codec (HEVC) decoder.

In addition, the type of content processed by the image processor in the disclosure is not limited. For example, the content that can be processed by the image processor may further include not only a moving image such as a video, but also still images such as a picture such as a JPEG file, a background screen, and a graphical user interface (GUI).

The type of the image processing process performed by the image processor of the disclosure is not limited, and the image processor may perform at least one of various processes such as de-interlacing that converts an interlace type broadcast signal into a progressive type, noise reduction for improving an image quality, detail enhancement, frame refresh rate conversion, and line scanning.

According to an embodiment, the image processor may be implemented as an image board in which various circuit configurations, such as various chipsets, memories, electronic components, and wirings, for performing each of the processes are mounted on a printed circuit board (PCB). In this case, in the electronic apparatus 10, a processor 550 including a tuner and an image processor may be provided on a single image board. Obviously, this is only an example, and these components may be provided on a plurality of printed circuit boards communicatively connected to each other.

According to an embodiment of the electronic apparatus, the processor 550 may process a corresponding signal so that an image of a predetermined channel is displayed based on a broadcast signal. In addition, the processor 550 may process the corresponding signal to display an image of predetermined content based on the signal received from the server through the interface circuitry 100.

According to an embodiment, the processor 550 may be implemented as a form included in a main SoC mounted on a PCB embedded in the electronic apparatus 10.

The control program may include a program(s) implemented in at least one of a BIOS, a device driver, an operating system, firmware, a platform, and an application. According to an embodiment, the application may be pre-installed or stored in the electronic apparatus 10 at the time of manufacturing of the electronic apparatus 10, or installed in the electronic apparatus 10 based on data of the application received from the outside when used later. The data of the application may be downloaded to the electronic apparatus 10 from an external server such as an application market. Such an external server is an example of a computer program product of the disclosure, but is not limited thereto.

The control program may be recorded on a storage medium that may be read by a device such as a computer. The machine-readable storage medium may be provided in a form of a non-transitory storage medium. Here, the 'non-transitory storage medium' means that the storage medium is a tangible device, and does not include a signal (for example, electromagnetic waves), and the term does not distinguish between the case where data is stored semi-permanently on a storage medium and the case where data is temporarily stored thereon. For example, the 'non-transitory storage medium' may include a buffer in which data is temporarily stored.

Figure 6:
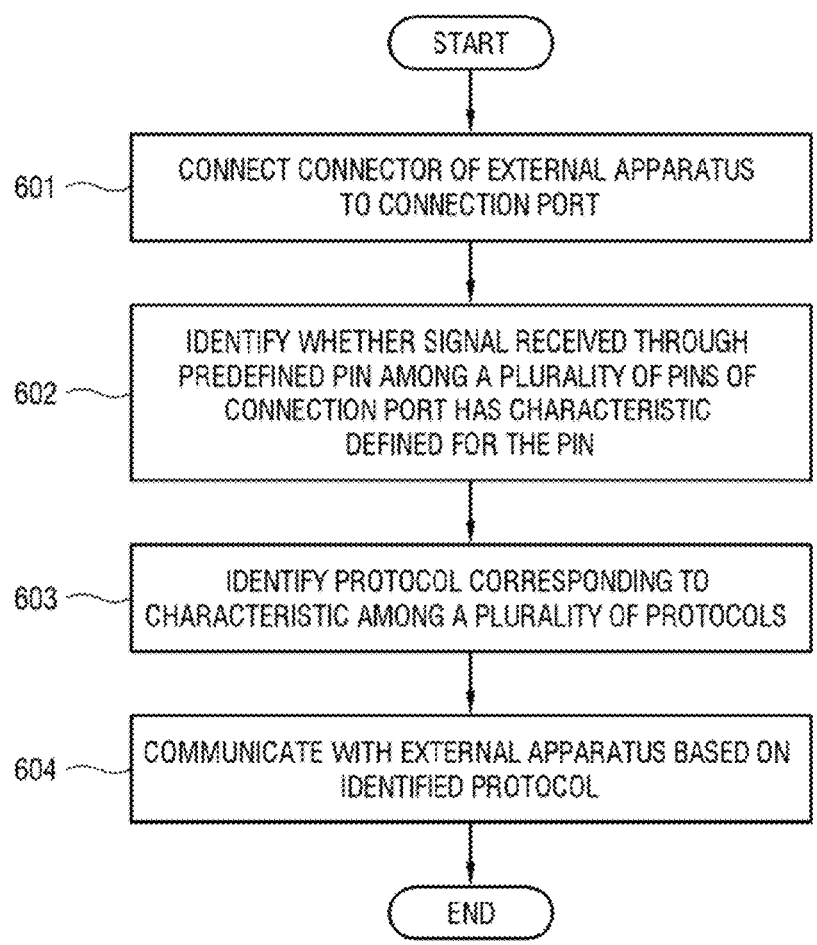
FIG. 6 is a flowchart of an operation of controlling the electronic apparatus according to an embodiment.

FIG. 6 is a flowchart of an operation of controlling the electronic apparatus according to an embodiment.

As shown in FIG. 6, the processor 550 of the electronic apparatus 10 may identify that the connector 210 of the external apparatus 20 is connected to the connection port 110 provided with a plurality of pins and capable of receiving signals according to a plurality of protocols (operation 601). Here, the processor 550 may identify that the connector 210 of the external apparatus 20 is connected to the connection port 110, on the basis of receiving a signal having a predefined status through a predetermined pin among the plurality of pins of the connection port 110.

In operation 602, the processor 550 may identify, based on the connection of the connector 210 of the external apparatus 20 to the connection port 110, whether a signal received through a pin predefined to correspond to a signal of the plurality of protocols received through the connection port 110 has characteristics defined for the pin (operation 602). The processor may then identify the protocol corresponding to the characteristic for the signal received from the external apparatus 20, based on the identification that the signal received through the predefined pin has the characteristics defined for the corresponding pin (operation 603).

According to an embodiment, the processor 550 may identify that the signal received through the predefined pin of the connection port 110 has characteristics defined based on the HDMI protocol, and the signal based on the HDMI protocol from the external apparatus 20 is received.

According to another embodiment, the processor 550 may identify that the signal received through the predefined pin of the connection port 110 has characteristics defined based on the USB protocol, and the signal based on the USB protocol from the external apparatus 20 is received.

The processor 550 may control the wired interface circuitry 100 to communicate with the external apparatus 20 based on the protocol identified in operation 603.

According to an embodiment, the operation of the processor 550 as described above may be implemented as a computer program stored in a computer program product separately provided from the electronic apparatus 10.

In this case, the computer program product may include a memory in which an instruction corresponding to the computer program is stored, and a processor. When the processor executes an instruction, the processor may identify, based on the connection of the connector 210 of the external apparatus 20 to the connection port 110, that the signal received through the predefined pin among the plurality of pins of the connection port 110 has the characteristics defined for the corresponding pin, and may identify the protocol corresponding to the characteristics among the plurality of protocols, based on the identification that the signal has the defined characteristics, and control to communicate with the external apparatus 20 based on the identified protocol.

As a result, the electronic apparatus 10 may download and execute the computer program stored in the separate computer program product to perform the operation of the processor 550.

Hereinafter, an embodiment of switching the signal connection of the communication circuitry by identifying the corresponding protocol for the external apparatus connected to the connection port in the electronic apparatus will be described with reference to the drawings.

Figure 7:
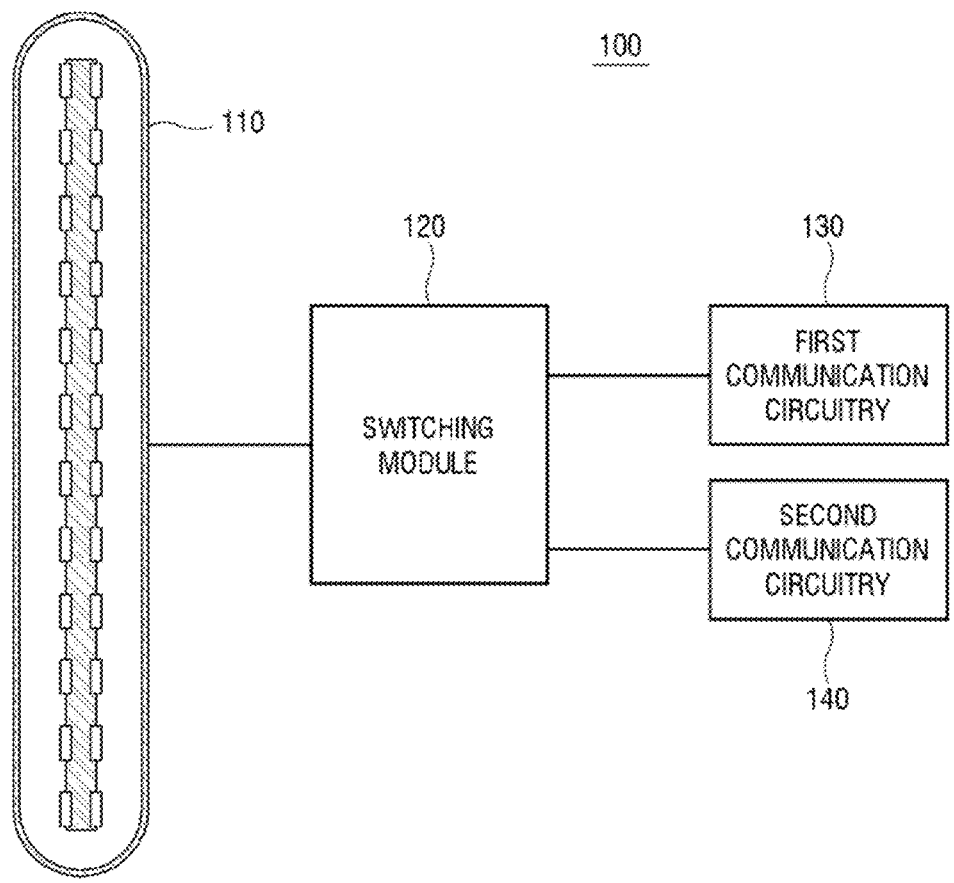
FIG. 7 is a block diagram of a wired interface circuitry of the electronic apparatus according to an embodiment.

FIG. 7 is a block diagram showing a configuration of a wired interface circuitry of the electronic apparatus according to an embodiment.

As shown in FIG. 7, the wired interface circuitry 100 of the electronic apparatus 10 may be implemented so the switching module 120 switches the signal connection between the connection port 110 and the plurality of communication circuitries, for example, the first communication circuitry 130 and the second communication circuitry 140.

According to an embodiment, the first communication circuitry 130 may be implemented as an HDMI communication circuitry or an HDMI receiver (HDMI Rx) capable of processing signals based on the HDMI protocol. In addition, in an embodiment, the second communication circuitry 140 may be implemented as a USB communication circuitry or a USB receiver (USB Rx) capable of processing signals based on the USB protocol.

However, the protocol applied to the first communication circuitry 130 and the second communication circuitry 140 are not limited, and therefore, the scope of disclosure may also include a case in which the first communication circuitry 130 or the second communication circuitry 140 are implemented as a communication circuitry capable of processing a signal based on different protocols, for example, the DP protocol.

According to an embodiment, when the connector 210 of the external apparatus 20 capable of providing HDMI signal/data, such as the HDMI source device, is connected to the connection port 110 of the wired interface circuitry 100, the connection port 110 may be switched to be connected to the first communication circuitry 130 by the switching module 120.

In addition, when the connector 210 of the external apparatus 20 capable of transmitting and receiving USB signal/data, such as the USB stick, is connected to the connection port 110 of the wired interface circuitry 100, the connection port 110 may be switched to be connected to the second communication circuitry 140 by the switching module 120.

The configuration of the wired interface circuitry 100, the implementation type of the switching module 120, the first communication circuitry 130, and the second communication circuitry 140 are not limited.

As an example, the wired interface circuitry 100 may be implemented as a communication module such as a chip including software blocks corresponding to the switching module 120, the first communication circuitry 130, and the second communication circuitry 140, respectively. As another example, the communication module implementing the wired interface circuitry 100 may include the switching module 120, the first communication circuitry 130, and the second communication circuitry 140 as a hardware configuration.

Figure 8:
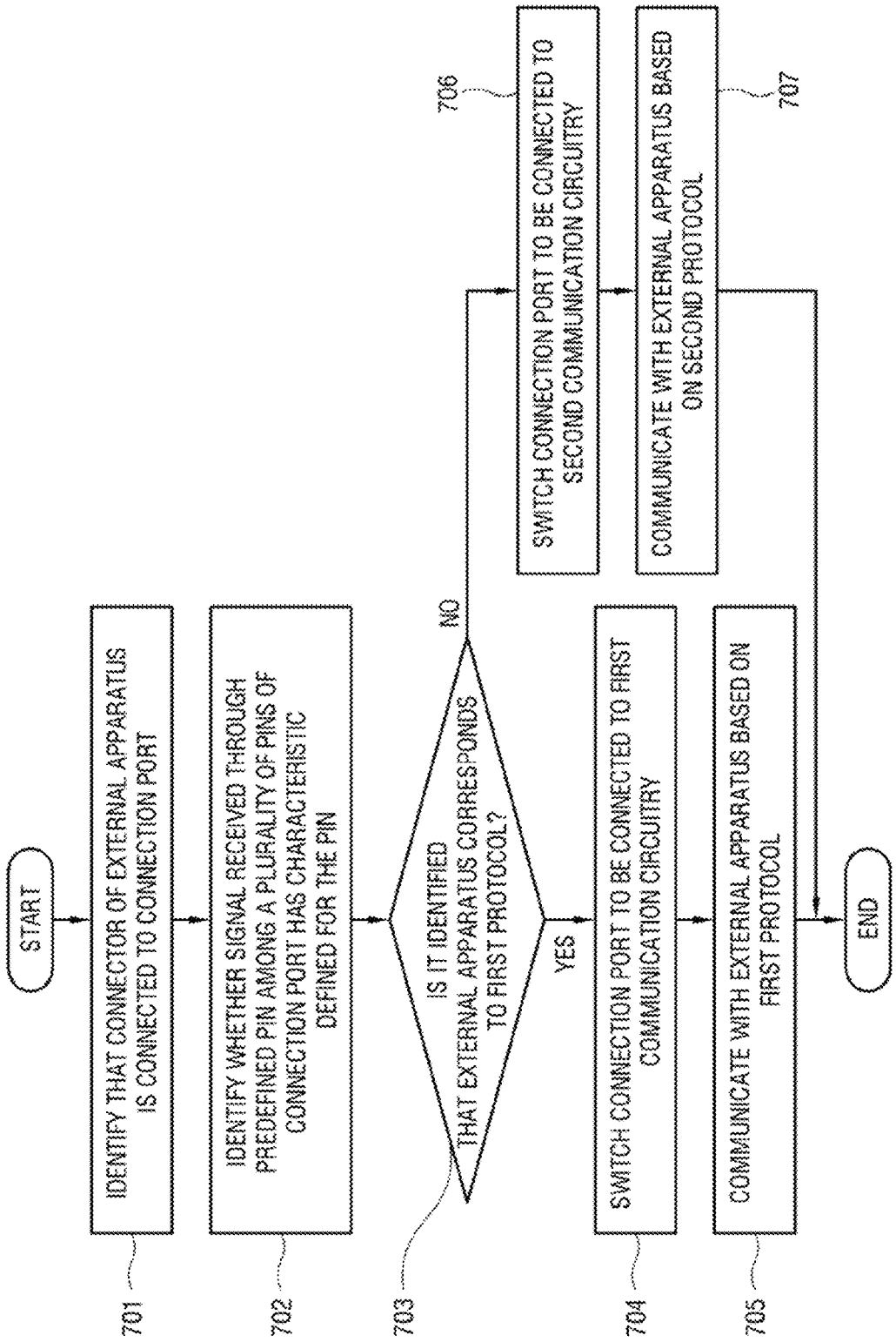
FIG. 8 is a flowchart of a method of controlling an electronic apparatus according to an embodiment.

FIG. 8 is a flowchart of a method of controlling an electronic apparatus according to an embodiment.

As shown in FIG. 8, the processor 550 of the electronic apparatus 10 may identify that the connector 210 of the external apparatus 20 is connected to the connection port 110 provided with a plurality of pins (operation 701).

According to an embodiment, the connection port 110 may receive a signal in each of a plurality of protocols. For example, the external apparatus 20 connected to the connection port 110 may transmit or receive a signal corresponding to the HDMI protocol or the USB protocol.

Specifically, the processor 550 may identify, based on the reception of a status change in at least one pin defined as a ground (common GND) pin among the plurality of pins of the connection port 110 such as pin A12 and pin B12 shown in FIG. 2 (for example, a change from a high signal to a low signal), that the connector 210 of the external apparatus 20 is connected to the connection port 110.

The processor 550 may identify, based on the connection of the connector 210 of the external apparatus 20 to the connection port 110 in operation 701, that the signal received through the predefined pin among the plurality of pins of the connection port 110 has the characteristics defined for the pin (operation 702).

According to an embodiment, the processor 550 may identify, based on the reception of the signal having a voltage of predefined characteristics (for example, a power signal (HDMI 5 V power) of 5 V) through pin A5 115 or pin B5 pin 116 defined as a power pin (hereinafter, referred to as a HDMI power pin) for HDMI usage in the alternate mode for USB Type C as at least one pin defined as, for example, a power pin as shown in FIG. 2, that the received signal has the characteristics of the power signal based on the HDMI protocol defined corresponding to the HDMI power pin.

The processor 550 may identify whether the external apparatus 20 that outputs the signal corresponding to the identification result of the signal in operation 702 corresponds to the first protocol (operation 703).

According to an embodiment, if it is identified that the signal received through the predefined pin in operation 702 is identified as having the characteristics of the power signal based on the HDMI protocol defined for the pin (HDMI power pin), the processor 550 may identify that the external apparatus 20 connected to the connection port 110 in step 701 corresponds to the first protocol, that is, the HDMI protocol.

When the processor 550 identifies in step 703 that the external apparatus 20 corresponds to the first protocol, that is, the HDMI protocol, the processor 550 may control the switching module 120 to connect the connection port 110 to the first communication circuitry 130 capable of processing the HDMI signal as the signal of the first protocol (operation 704).

The processor 550 may control the wired interface circuitry 100 to communicate with the external apparatus 20 based on the first protocol identified in step 703, that is, the HDMI protocol (operation 705).

On the other hand, when the processor 550 identifies in step 703 that the external apparatus 20 does not correspond to the first protocol, that is, the HDMI protocol, the processor 550 may control the switching module 120 to connect the connection port 110 to the second communication circuitry 140 capable of processing the USB signal as the signal of the second protocol other than the first protocol (operation 706).

The processor 550 may control the wired interface circuitry 100 to communicate with the external apparatus 20 based on the second protocol, that is, the USB protocol (operation 707).

According to an embodiment, the first protocol identified in operation 703 of the embodiment of FIG. 8 as described above is not limited to the HDMI protocol. For example, when the wired interface circuitry 100 including the connection port 110 is capable of receiving not only the HDMI signal but also the USB signal, the processor 550 may use the connected external apparatus 20 as the first protocol to identify whether it corresponds to the USB protocol.

That is, as another embodiment, in operation 702, the processor 550 may control to transmit a power signal having predetermined characteristics, for example, a power signal of 5 V to an external apparatus 200 connected through, as a third pin among the plurality of pins of the connection port 110, for example, at least one pin defined to provide a voltage having the predefined characteristics to the external apparatus 20, that is, pin A4 111, pin B4 112, pin A9 113, or pin B9 114 defined as a power pin (VBUS pin) (hereinafter, referred to as a USB power pin) for USB usage in the alternate mode for USB Type C. Further, the processor 550 may check the status in the USB signal, for example, a USB lock status that is transmitted or received through at least one pin defined to transmit or receive the USB signal among the plurality of pins of the connection port 110, for example, pin A6, pin B6, pin A7, or pin B7.

The processor 550 may identify whether the connected external apparatus 20 corresponds to the USB protocol as the first protocol based on the state of the USB signal in operation 702 (operation 703).

According to another embodiment, when the processor 550 identifies in operation 703 that the external apparatus 20 corresponds to the first protocol, which may be the USB protocol, the processor 550 may control the switching module 120 to connect the connection port 110 to the first communication circuitry 130 capable of processing the USB signal as the signal of the first protocol (operation 704), and control the wired interface circuitry 100 to communicate with the external apparatus 20 based on the USB protocol (operation 705).

On the other hand, according to another embodiment, when the processor 550 identifies in step 703 that the external apparatus 20 does not correspond to the first protocol, that is, the USB protocol, the processor 550 may control the switching module 120 to connect the connection port 110 to the second communication circuitry 140 capable of processing the HDMI signal as the signal of the second protocol other than the first protocol (operation 706), and may control the wired interface circuitry 100 to communicate with the external apparatus 20 based on the HDMI protocol (operation 707).

As described above, the electronic apparatus 10 according to the embodiment of FIGS. 7 and 8 may identify based on the signal through the specific pin of the connection port 110 whether the external apparatus 20 connected through the connection port 110 implemented as the common port to which the plurality of external apparatuses corresponding to the plurality of different protocols are connectable corresponds to the first protocol or the second protocol, and switch the connection port 110 to be connected to any one of the communication circuitries provided to correspond to each protocol by the switching module 120 (for example, any one of the first communication circuitry 130 and the second communication circuitry 140) in response to the identification result, thereby normally performing the communication.

Figure 9:
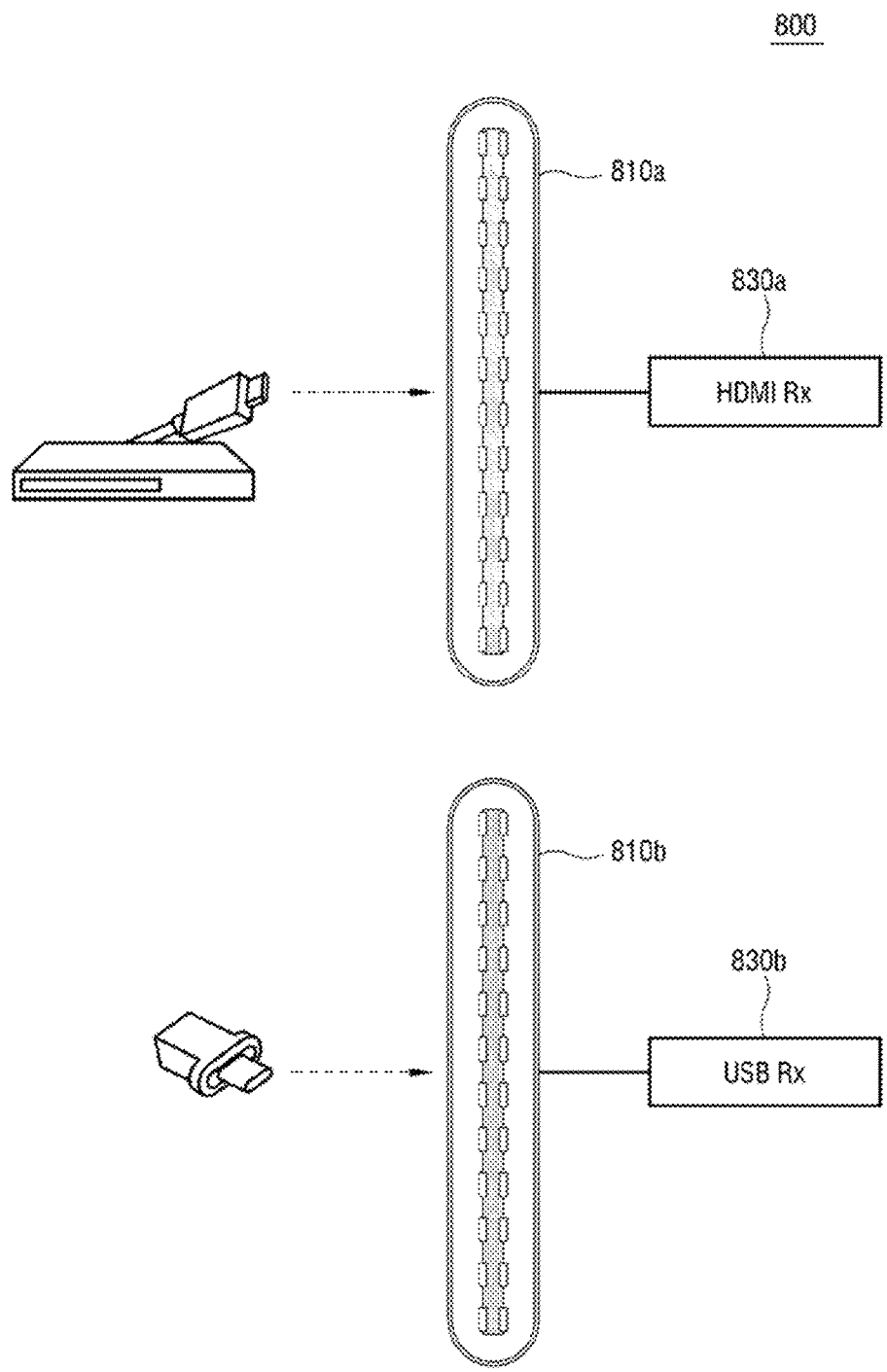
FIG. 9 is a diagram of an electronic apparatus in which a plurality of connection ports having the same shape for each of the plurality of protocols provided as a related art.

FIG. 9 is a diagram showing electronic apparatus in which a plurality of connection ports having the same shape for each of the plurality of protocols are provided as a related art.

As shown in FIG. 9, a wired interface circuitry 800 of the electronic apparatus according to the related art includes a plurality of input ports 810*a* and 810*b* having the same shape and a plurality of communication circuitries 830*a* and 830*b* respectively connected to each input port 810*a* and 810*b*.

When the electronic apparatus according to the related art includes, for example, a wired interface circuitry 800 that implements the HDMI alternate mode for USB type C, the wired interface circuitry 800 includes a first input port 810*a* provided for the connection usage of the external apparatus corresponding to the HDMI protocol and a second input port 810*b* provided for the connection usage of the external apparatus corresponding to the USB protocol. Here, the user checks a guide indicating the HDMI or USB usage specified outside the device, and connects and uses an external apparatus to an input port suitable for each usage.

Specifically, as shown in FIG. 9, in the electronic apparatus of the related art, the first input port 810*a* is connected only to the first communication circuitry 830*a* implemented as an HDMI receiver (HDMI Rx) capable of processing the HDMI signal. That is, when a user who is inexperienced in using the device does not check the guide in advance and connects the USB stick to the first input port 810*a*, the first communication circuitry 830*a* may not process the USB signal, and therefore, the normal data communication is not performed, resulting in the user inconvenience.

Likewise, as shown in FIG. 9, in the electronic apparatus of the related art, the second input port 810*b* is connected only to the second communication circuitry 830*b* implemented as a USB receiver (USB Rx) capable of processing the USB signal. That is, when the user who is inexperienced in using the device does not check the guide in advance and connects the HDMI source to the second input port 810*b*, the first communication circuitry 830*a* cannot process the HDMI signal, and thus the electronic apparatus may not normally receive a signal from the external apparatus, so no image is displayed on the display, resulting in the user inconvenience.

In addition, as another related art, there may be a case of connecting a separate adapter for signal conversion or switching to a connection port provided as a common port on the electronic apparatus. In this case, costs may be wasted or user inconvenience may result from a separate purchase of the adapter, a risk of loss, and the like.

Accordingly, the electronic apparatus 10 according to the embodiment of FIGS. 7 and 8 may be used by connecting the plurality of external apparatuses 20 provided to transmit and receive signals of different protocols to a single connection port 110 without user confusion, compared to the related technologies. In addition, only the minimum number of connection ports 110 is provided in the electronic apparatus 10 and a separate adapter needs not to be provided, so the miniaturization and aesthetic improvement of the electronic apparatus 10 may be achieved and the user convenience may be improved.

Hereinafter, an embodiment of a control operation for performing communication, when the HDMI source or the UBS stick is connected as an external apparatus, will be described in more detail with reference to the drawings.

Figure 10:
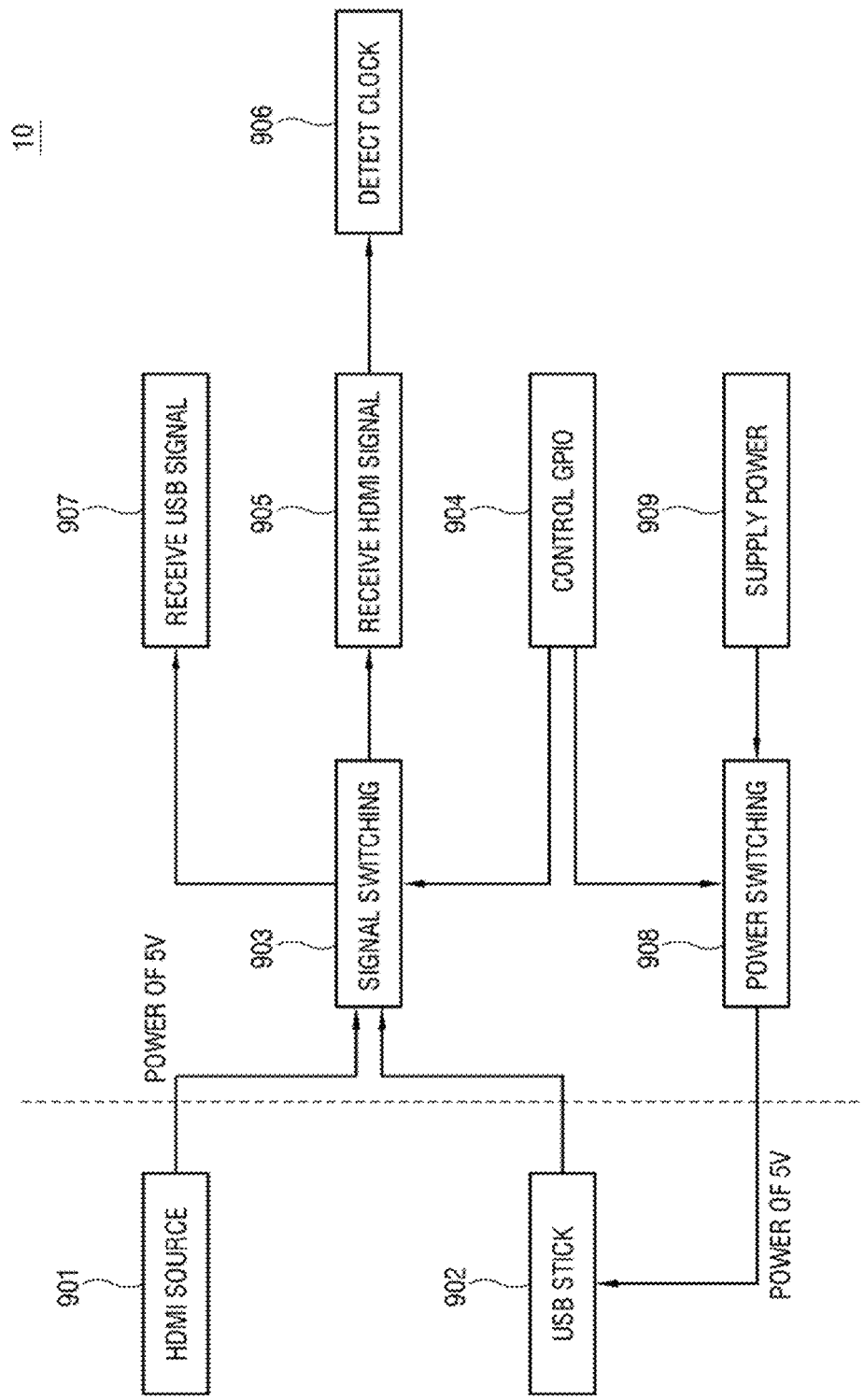
FIG. 10 is a block diagram of a control operation when an external apparatus is connected in the electronic apparatus according to an embodiment.
Figure 11:
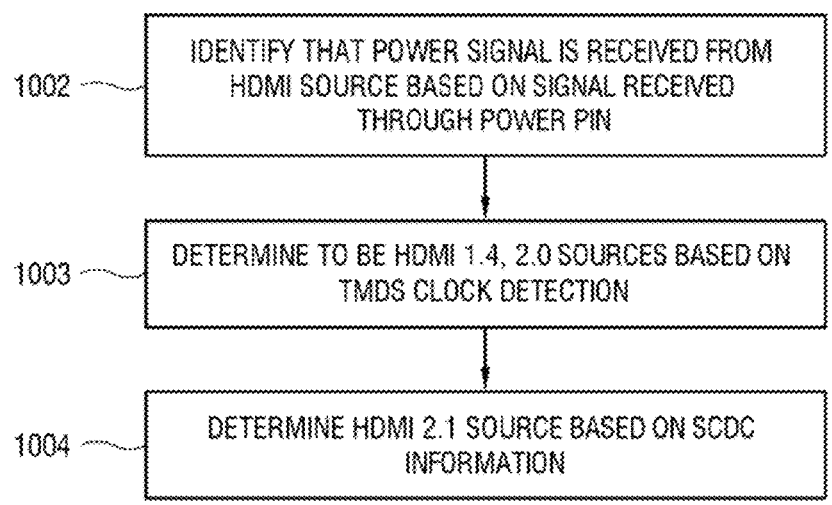
FIG. 11 is a flowchart of an operation of identifying that an HDMI source is connected as the external apparatus in the electronic apparatus according to an embodiment.
Figure 12:
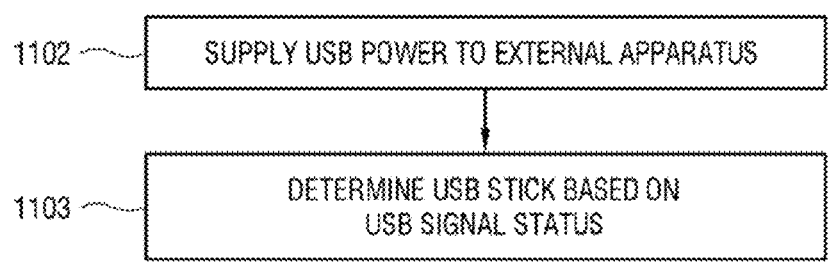
FIG. 12 is a flowchart of an operation of identifying that a USB stick is connected as the external apparatus in the electronic apparatus according to an embodiment.

FIG. 10 is a block diagram showing a control operation when the external apparatus is connected to the electronic apparatus according to an embodiment. FIG. 11 is a flowchart of an operation of identifying that the HDMI source is connected as the external apparatus in the electronic apparatus according to an embodiment. FIG. 12 is a flowchart of an operation of identifying that the USB stick is connected as the external apparatus in the electronic apparatus according to an embodiment.

According to an embodiment, the electronic apparatus 10 may be provided with the wired interface circuitry 100 including the connection port 110 capable of receiving signals according to the plurality of protocols, for example, a USB signal and an HDMI signal. The electronic apparatus 10 may be connected to a HDMI source 901 or a USB stick 902 as the external apparatus 20 through the connection port 110 provided with the plurality of pins as shown in FIG. 10.

As described in operation 701 of FIG. 8, the processor 550 of the electronic apparatus 10 may identify that the connector 210 of the external apparatus 20 is connected to the connection port 110 based on the status change in the signal received through the common GND pin among the plurality of pins of the connection port 110.

As described in operations 702 and 703 of FIG. 8, the processor 550 may identify whether the signal received through the predefined pin among the plurality of pins of the connection port 110 has characteristics corresponding to any one of the plurality of protocols to identify whether the connected external apparatus 20 is the HDMI source 901 corresponding to the HDMI or the USB stick 902 corresponding to the USB protocol.

The wired interface circuitry 100 of the electronic apparatus 10 may respond to whether the external apparatus 200 connected through the connection port 110 is the HDMI source 901 or the USB stick 902 to perform the signal switching (903) so that the connection port 110 is connected to the HDMI receiver as the first communication circuitry 130 or is connected to the USB receiver as the second communication circuitry 140. According to an embodiment, the signal switching 903 may be controlled by the processor 550 through a general-purpose input/output (GPIO) control 904, as shown in FIG. 10.

For example, when the HDMI source 901 is connected to the connection port 110, as shown in FIG. 10, the HDMI signal may be received by the first communication circuitry 130 by the signal switching 903 (905).

Here, the HDMI signal received by the first communication circuitry 130 may include a power signal. The power signal may include power of 5 V that is received through a first pin among a plurality of pins of the connection port 110. That is, at least one pin defined as a power pin such as pin A5 115 or pin B5 116 defined as a power pin (HDMI power pin) for HDMI usage in the alternate mode for USB Type C as shown in FIG. 2.

In addition, the HDMI signal received by the first communication circuitry 130 may include a clock signal. The clock signal may be received through a second pin among the plurality of pins of the connection port 110. That is, at least one pin may be defined as a clock pin such as pin B10 117 or pin B11 118 defined as a transition minimized differential signaling type data pin in the alternate mode for USB Type C as shown in FIG. 2.

According to an embodiment, the first communication circuitry 130 may include a clock detector that may check (TMDS clock detection check) whether a clock having predefined characteristics (for example, a TMDS clock) is identified/detected in a signal received through a second pin (clock pin) among a plurality of pins (906). The processor 550 may identify a protocol corresponding to the clock signal based on the detection, that is, reception of the clock signal having the predefined characteristics.

The processor 550 may identify whether the signal received from the connected HDMI source 901 has characteristics corresponding to any one of the plurality of versions of the HDMI protocol, depending on whether the clock or data having the predefined characteristics is identified in the signal received through the second pin among the plurality of pins.

For example, when the TMDS clock is detected, the processor 550 may identify that the signal based on HDMI 1.4 protocol or HDMI 2.0 protocol is received from the connected HDMI source 901.

On the other hand, when a signal based on HDMI 2.1 protocol is received from the connected HDMI source 901, the identification based on the TMDS clock check may not be performed.

According to an embodiment, the processor 550 may identify whether the signal based on the HDMI 2.1 protocol is received by checking information/data based on a fixed rate link (FRL) using a status and control data channel (SCDC) register of the HDMI source 901 connected through the connection port 110. That is, when the SCDC information/data is identified (detected) the processor 550 may identify that the signal based on the HDMI 2.1 protocol is received from the connected HDMI source 901.

According to the embodiment of the disclosure, the processor 550 may determine, based on the identification processes based on the power signal, the clock signal, and the SCDC information received through each pin of the connection port 11, that the connected external apparatus 20 is the HDMI source 901 corresponding to the HDMI protocol.

Specifically, as shown in FIG. 11, the processor 550 may first identify that the power signal is received from the HDMI source 901, based on the signal received through the first pin (for example the pin A5 115 or the pin B5 116) which is the power pin for HDMI usage (HDMI power pin) (operation 1002).

Then, the processor 550 may identify, based on the TDMS clock detection through the second pin (for example pin B10 117 or pin B11 118) defined as the TMDS type data pin, that the HDMI source 901 is HDMI 1.4, 2.0 sources (operation 1003).

In addition, the processor 550 may identify that the HDMI source 901 is a HDMI 2.1 source based on the SCDC information acquired based on the FRL from the HDMI source 901 connected through the connection port 110 (operation 1004).

The identification processes of the HDMI source 901 in steps 1002, 1003, and 1004 may be sequentially performed according to the illustrated order, or at least some of the identification processes may be performed simultaneously or in reverse order in some cases.

According to an embodiment, the processor 550 may identify based on the above identification processes that not only the connected external apparatus 20 simply transmits the signal of the HDMI protocol, but also the HDMI protocol version, thereby more smoothly performing the communication between the electronic apparatus 10 and the external apparatus 20.

As another example, when the USB stick 902 is connected to the connection port 110, as shown in FIG. 10, the USB signal may be received by the second communication circuitry 140 by the signal switching 903 (907).

In this case, the power signal may be transmitted from the electronic apparatus 10 to the connected external apparatus 20, that is, the USB stick 902.

The wired interface circuitry 100 of the electronic apparatus 10 may perform power switching 908 so that the power signal is transmitted to the USB stick 902 connected through the connection port 110, and may supply power from the power supplier 540 to the USB stick 902 (909). According to an embodiment, the power switching 908 may be controlled by the processor 550 through the GPIO control 904, as shown in FIG. 10.

The power signal may be transmitted through a third pin among a plurality of pins of the connection port 110, that is, at least one pin defined as the USB power pin such as pin A4 111, pin B4 112, pin B9 113, or pin A9 114 defined as a USB power pin (VBUS pin) for USB usage in the alternate mode for USB Type C as shown in FIG. 2.

According to an embodiment, the processor 550 may supply the USB power through the connection port 110 as described above, and check a status signal received from the external apparatus 20 in response thereto, thereby determining that the connected external apparatus 20 is the USB stick 902.

Specifically, as shown in FIG. 12, in response to identifying that the connector 210 of the external apparatus 20 is connected to the connection port 110, the processor 550 may first supply USB power from the power supplier 540 to the connected external apparatus 20 through the connection port 110 by the power switching (operation 1102). Here, the USB power may be transmitted as the power signal through the third pin among the plurality of pins of the connection port 110 (for example the pin A4 111, the pin B4 112, the pin B9 113, or the pin A9 114) that is the USB power pin (VBUS pin).

Further, the processor 550 may determine that the connected external apparatus 20 is the USB stick 902 based on the USB signal status received from the external apparatus 20 (operation 1103). Here, the processor 550 may check the status in the USB signal that is transmitted or received through at least one pin defined to transmit or receive the USB signal among the plurality of pins of the connection port 110 (for example, the pin A6, pin B6, pin A7, or pin B7 shown in FIG. 2) thereby determining that the connected external apparatus 20 is the USB stick 902.

As described in FIG. 12, when the connection of the external apparatus 20 is identified, the processor 550 may first supply the USB power, and check whether the USB signal is received from the external apparatus 20 in response thereto, thereby determining that corresponding external apparatus 20 is the USB stick 902.

According to an embodiment, even when the USB stick 902 that needs to supply power from the slave device as the external apparatus 20 to the source device is connected to the connection port 110 through the above processes, the processor 550 may identify that the connected apparatus is the USB stick 902, thereby smoothly performing the communication between the electronic apparatus 10 and the external apparatus 20.

According to an embodiment, when the processor 550 identifies that the external apparatus 20 is connected to the connection port 110, the electronic apparatus 10 may be implemented to first perform operations 1002, 1003, and 1004 of FIG. 11 to determine whether the connected external apparatus 20 is the HDMI source and then perform operations 1102 and 1103 of FIG. 12 to determine whether the connected external apparatus 20 is the USB stick.

According to another embodiment, when the processor 550 identifies that the external apparatus 20 is connected to the connection port 110, the electronic apparatus 10 may be implemented to first perform operations 1102 and 1103 of FIG. 12 to determine whether the connected external apparatus 20 is the USB stick and then perform operations 1002, 1003, and 1004 of FIG. 11 to determine whether the connected external apparatus 20 is the HDMI source. Here, even when the connected external apparatus 20 is the HDMI source, even if the USB power signal is transmitted to the external apparatus 20 according to step 1102 of FIG. 12, the operation of the HDMI source is not affected.

According to an embodiment, the methods according to various embodiments disclosed in the document may be included in a computer program product and provided. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smartphones) online. In case of the online distribution, at least a portion of the computer program product (for example, downloadable app) may be at least temporarily stored in a storage medium such as a memory of a server of a manufacturer, a server of an application store, or a relay server or be temporarily generated.

According to the embodiments as described above, when the external apparatus 20 is connected to the connection port 110 provided to transmit or receive signals based on a plurality of different protocols, the electronic apparatus 10 may automatically identify the protocol of the signal received through the connection port 110, thereby performing the communication with the connected external apparatus 20 based on the identified protocol.

Accordingly, the number of connection ports 110 provided in the electronic apparatus 10 may be minimized, and any of the plurality of external apparatuses corresponding to different protocols may be used by being connected to the connection port 110 as necessary without the user confusion or malfunction.

According to the electronic apparatus and the method of controlling the same as described above, it is possible to prevent the user confusion or malfunction in connecting and using the plurality of external apparatuses, which transmit signals of different protocols, to one connection port, by automatically identifying the protocol of the signal received through the connection port and performing the scene with the external apparatus based on the identified protocol.

Hereinabove, the disclosure has been described in detail through the preferred embodiments, but the disclosure is not limited thereto and may be implemented in various ways within the scope of the claims. It will be understood by those skilled in the art that various changes in form and details may be made therein without departing from the spirit and scope of the disclosure.

What is claimed is:

1. An electronic apparatus, comprising:
    a connection port comprising a plurality of pins, the connection port being configured to receive a first signal through a first pin, the first pin being predefined to correspond to any one of signals of a plurality of protocols receivable through the connection port; and
    a processor configured to:
        identify, based on a connection between a connector of an external apparatus and the connection port, whether the first signal has a first characteristic predefined for the first pin,
        identify, based on the identification that the first signal has the first characteristic, a first protocol corresponding to the first characteristic among the plurality of protocols, and control to communicate with the external apparatus based on the identified first protocol,
wherein the plurality of protocols comprise at least one of a high definition multimedia interface (HDMI) and a universal serial bus (USB).

2. The electronic apparatus of claim 1, wherein the plurality of pins comprises a ground pin, and
the processor is further configured to identify that the connector of the external apparatus is connected to the connection port based on a change in a signal status of the ground pin.

3. The electronic apparatus of claim 1, wherein the processor is further configured to identify the first protocol corresponding to the first characteristic based on reception of the first signal having a predefined voltage through the first pin.

4. An electronic apparatus, comprising:
a connection port comprising a plurality of pins, the connection port being configured to receive a first signal through a first pin, the first pin being predefined to correspond to any one of signals of a plurality of protocols receivable through the connection port; and
a processor configured to:
identify, based on a connection between a connector of an external apparatus and the connection port, whether the first signal has a first characteristic predefined for the first pin,
identify, based on the identification that the first signal has the first characteristic, a first protocol corresponding to the first characteristic among the plurality of protocols, and
control to communicate with the external apparatus based on the identified first protocol,
wherein the processor is further configured to identify additional information corresponding to the first protocol based on identification of clock or data that has a predefined characteristic in a second signal received through a second pin among the plurality of pins.

5. The electronic apparatus of claim 4, wherein the processor is further configured to identify whether the second signal received through the second pin has a predefined second characteristic corresponding to one of a plurality of versions of the first protocol.

6. The electronic apparatus of claim 1, wherein the processor is further configured to preferentially identify whether the first signal has the first characteristic predefined corresponding to the HDMI among the plurality of protocols.

7. The electronic apparatus of claim 1, wherein the processor is further configured to, based on the identification that the first signal does not have the first characteristic:
transmit a second signal to the external apparatus through a second pin, the second signal having a second characteristic predefined to the second pin,
based on receiving a third signal from the external apparatus through a third pin, identify a second protocol corresponding to the second characteristic among the plurality of protocols, and control to communicate with the external apparatus based on the identified second protocol,
wherein the first pin, the second pin and the third pin are different pins.

8. The electronic apparatus of claim 1, further comprising:
a plurality of communication circuitries corresponding to the plurality of protocols; and
a switching module configured to switch a signal connection between the connection port and the plurality of communication circuitries,
wherein the processor is further configured to control the switching module to connect between the connection port and a communication circuitry corresponding to the identified first protocol.

9. An electronic apparatus, comprising:
a connection port comprising a plurality of pins, the connection port being configured to receive a first signal through a first pin, the first pin being predefined to correspond to any one of signals of a plurality of protocols receivable through the connection port; and
a processor configured to:
identify, based on a connection between a connector of an external apparatus and the connection port, whether the first signal has a first characteristic predefined for the first pin,
identify, based on the identification that the first signal has the first characteristic, a first protocol corresponding to the first characteristic among the plurality of protocols, and
control to communicate with the external apparatus based on the identified first protocol,
wherein the connection port is USB type C.

10. A method of controlling an electronic apparatus, comprising:
identifying, based on a connection between a connector of an external apparatus and a connection port having a plurality of pins, whether a first signal received through a first pin among the plurality of pins has a first characteristic predefined for the first pin;
identifying, based on the identification that the first signal has the first characteristic, a first protocol corresponding to the first characteristic among a plurality of protocols receivable through the connection port; and
communicating with the external apparatus based on the identified first protocol,
wherein the first pin is predefined to correspond to any one of signals of the plurality of protocols receivable through the connection port, and
wherein the plurality of protocols comprise at least one of a high definition multimedia interface (HDMI) and a universal serial bus (USB).

11. The method of controlling an electronic apparatus of claim 10, wherein the plurality of pins includes a ground pin, and
the method of controlling the electronic apparatus further comprises identifying that the connector of the external apparatus is connected to the connection port based on a change in a signal status of the ground pin.

12. The method of controlling an electronic apparatus of claim 10, wherein the identifying whether the first signal has the first characteristic predefined for the first pin comprises identifying the first protocol corresponding to the first characteristic based on reception of the first signal having a predefined voltage through the first pin.

13. A method of controlling an electronic apparatus, comprising:
identifying, based on a connection between a connector of an external apparatus and a connection port having a plurality of pins, whether a first signal received through a first pin among the plurality of pins has a first characteristic predefined for the first pin;
identifying, based on the identification that the first signal has the first characteristic, a first protocol corresponding to the first characteristic among a plurality of protocols receivable through the connection port; and communicating with the external apparatus based on the identified first protocol, wherein the first pin is predefined to correspond to any one of signals of the plurality of protocols receivable through the connection port, wherein the identifying of the first protocol corresponding to the first characteristic comprises identifying additional information corresponding to the first protocol based on identification of clock or data that has a predefined characteristic in a second signal received through a second pin among the plurality of pins.

14. The method of controlling an electronic apparatus of claim 13, further comprising:

identifying whether the second signal received through the second pin has a predefined second characteristic corresponding to any one of a plurality of versions of the first protocol.

15. The method of controlling an electronic apparatus of claim 10, wherein the identifying of whether the first signal has the first characteristic comprises preferentially identifying; whether the first signal has the first characteristic redefined corresponding to the HDMI among the plurality of protocols.

16. The method of controlling an electronic apparatus of claim 10, the method further comprises, based on the identification that the first signal does not have the first characteristic:

transmitting a second signal to the external apparatus through a second pin, the second signal having a second characteristic predefined to the second pin, based on receiving a third signal from the external apparatus through a third pin, identifying a second protocol corresponding to the second characteristic among the plurality of protocols, and communicating with the external apparatus based on the identified second protocol, wherein the first pin, the second pin and the third pin are different each other.

17. The method of controlling an electronic apparatus of claim 10, wherein the electronic apparatus further includes a plurality of communication circuitries corresponding to the plurality of protocols; and a switching module configured to switch a signal connection between the connection port and the plurality of communication circuitries, and the method of controlling the electronic apparatus further comprises controlling the switching module to connect between the connection port and a communication circuitry corresponding to the identified first protocol.

18. A nonvolatile computer-readable recording medium recorded with a program of a method executable by a processor of an electronic apparatus, wherein the method includes:

identifying, based on a connection between a connector of an external apparatus and a connection port having a plurality of pins, whether a first signal received through a first pin among the plurality of pins has a first characteristic predefined for the first pin;

identifying, based on the identification that the first signal has the first characteristic, a first protocol corresponding to the first characteristic among a plurality of protocols receivable through the connection port; and communicating with the external apparatus based on the identified first protocol, wherein the first pin is predefined to correspond to any one of signals of the plurality of protocols receivable through the connection port, and wherein the plurality of protocols comprise at least one of a high definition multimedia interface (HDMI) and a universal serial bus (USB).

* * * * *